United States Patent [19]
Akiba et al.

[11] Patent Number: 5,459,866
[45] Date of Patent: Oct. 17, 1995

[54] METHOD OF AUTOMATICALLY PRODUCING JOB FLOW SPECIFICATION

[75] Inventors: Shinichi Akiba, Yokohama; Ichiro Naito, Shibuya; Hiroshi Tsukino, Yokohama, all of Japan

[73] Assignees: Hitachi, Ltd., Tokyo; Hitachi System Engineering, Ltd., Kanagawa, both of Japan

[21] Appl. No.: 113,813

[22] Filed: Aug. 31, 1993

[30] Foreign Application Priority Data

Sep. 3, 1992 [JP] Japan ..................... 4-235828

[51] Int. Cl.$^6$ ..................... G06F 9/00
[52] U.S. Cl. ..................... 395/650; 395/700; 364/DIG. 1; 364/280; 364/280.4; 364/280.5
[58] Field of Search ..................... 395/650, 700; 364/280.4, 280.5

OTHER PUBLICATIONS

Landis, et al.; "Documentation in a Software Maintainance Environment"; Technical Solutions, Jun. 1988.

*Primary Examiner*—Kevin A. Kriess
*Assistant Examiner*—Jonathan Hall Backenstose
*Attorney, Agent, or Firm*—Antonelli, Terry, Stout & Kraus

[57] ABSTRACT

In a support system for software development implemented on a computer, a file input/output distinction related to a utility whose program can not be analyzed is preliminarily registered in the support system, job control language which is the subject of automatic production of a job flow specification is input, the job control language and a source program are analyzed and basic job flow information is produced. A job flow specification is automatically produced by deriving a file input/output distinction from a load module name in the input job control language and one of source program analysis information corresponding thereto, utility information and job control language analysis information.

7 Claims, 19 Drawing Sheets

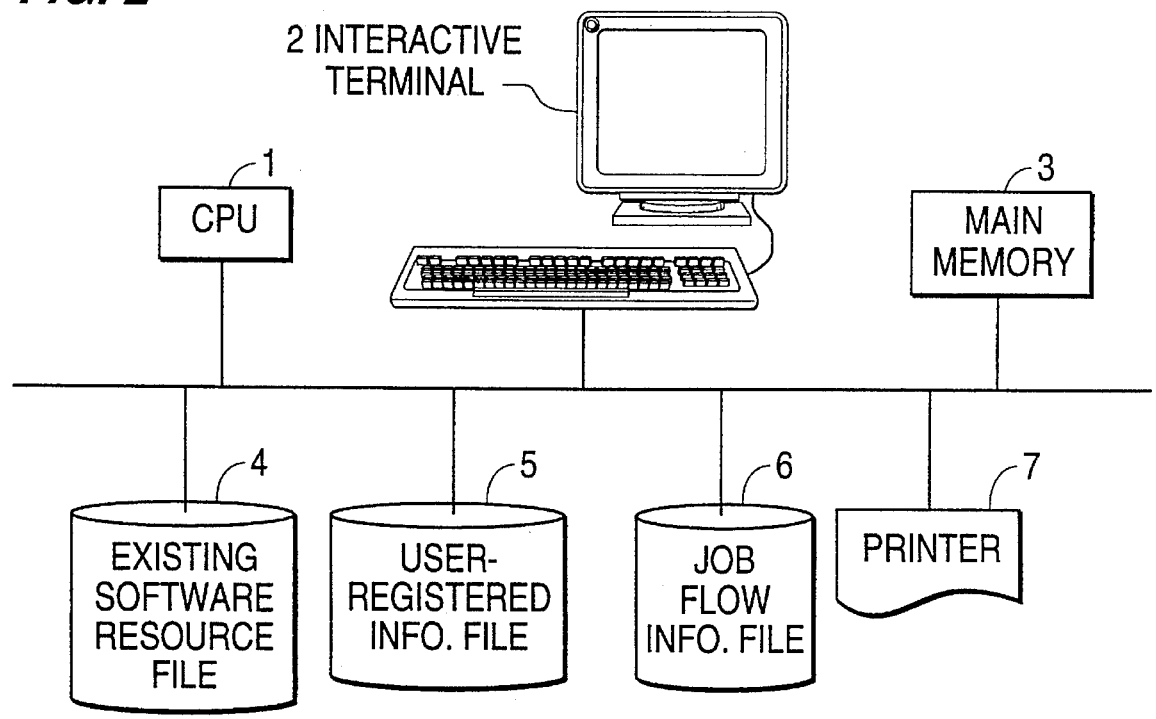

FIG. 4

```
//JOB1     JOB
//STEP1    EXEC PGM=PROGO1
//DD1      DD DSN=SAMPLE1, DISP=SHR
//DD2      DD DSN=SAMPLE2, DISP=SHR
//STEP2    EXEC PGM=TESTPROG
//DD3      DD DSN=SAMPLE2, DISP=SHR
//DD4      DD DNS=SORTFIN, DISP=OLD
//STEP3    EXEC PGM=SORT
//SYSPRINT DD SYSOUT=A
//SORTWK01 DD UNIT=DISK, SPACE=(CYL, (5,1))
//SORTIN   DD DSN=SORTFIN, DISP=SHR
//SORTOUT  DD DSN=SORTFOUT, DISP=(NEW, KEEP, DELETE),
//           UNIT=DISK, VOL=SER=VOL001, SPACE=(CYL, 3),
//           DCB=(RECFM=FB, LRECL=100, BLKSIZE=1000)
//SYSIN    DD *
  SORT    FIELDS=(25, 8, ZD, A), SIZE=E5000
/*
//
```

401 — JOB1
402 — STEP1
403 — SAMPLE1
404 — PROGO1
405 — DD1
406 — DISP=SHR

FIG. 5

| JOB NAME | JOB STEP NAME | LOAD MODULE NAME | PHYSICAL FILE NAME | DD NAME | I/O DISTINCTION | TEMPORARY FILE DISTINCTION |
|---|---|---|---|---|---|---|
| JOB1 | STEP1 | PROGO1 | SAMPLE1 | DD1 | I | |
| JOB1 | STEP1 | PROGO1 | SAMPLE2 | DD2 | I | |
| JOB1 | STEP2 | TESTPROG | SAMPLE2 | DD3 | I | |
| JOB1 | STEP2 | TESTPROG | SORTFIN | DD4 | O | |
| JOB1 | STEP3 | SORT | | SYSPRINT | O | |
| JOB1 | STEP3 | SORT | | SORKWK01 | IO | |
| JOB1 | STEP3 | SORT | SORTFIN | SORTIN | I | |
| JOB1 | STEP3 | SORT | SORTFOUT | SORTOUT | O | |

| 2ND PARAMETER/ 1ST PARAMETER | DELETE | KEEP | PASS | CATLG | UNCATLG | NONE |
|---|---|---|---|---|---|---|
| NEW | IO | Y O | O | O | O | SAME AS DELETE |
| MOD | IO | O | O | O | O | SAME AS KEEP |
| RNW | IO | Y O | O | O | O | SAME AS DELETE |
| OLD | IO | O | O | O | O | SAME AS KEEP |
| SHR | I | I | I | I | I | SAME AS KEEP |
| NONE | SAME AS NEW | | | | | |

| PROGRAM NAME | LOGIC FILE NAME | DD NAME | RECORD NAME | I/O DISTINCTION |
|---|---|---|---|---|
| PROG01 — 801 | INFILE — 802 | DD1 — 803 | IN-REC — 804 | I — 805 |
| PROG01 | OUTFILE | DD2 | OUT-REC | O |

FIG. 9

| JOB NAME | JOB STEP NAME | LOAD MODULE NAME | PHYSICAL FILE NAME | DD NAME | I/O DISTINCTION | TEMPORARY FILE DISTINCTION |
|---|---|---|---|---|---|---|
| JOB1 — 901 | STEP1 — 902 | PROG01 — 903 | SAMPLE1 — 904 | DD1 — 905 | I — 906 | |
| JOB1 | STEP1 | PROG01 | SAMPLE2 | DD2 | O | |
| JOB1 | STEP2 | TESTPROG | SAMPLE2 | DD3 | I | |
| JOB1 | STEP2 | TESTPROG | SORTFIN | DD4 | O | |
| JOB1 | STEP3 | SORT | | SYSPRINT | O | |
| JOB1 | STEP3 | SORT | | SORKWK01 | IO | Y — 907 |
| JOB1 | STEP3 | SORT | SORTFIN | SORTIN | I | |
| JOB1 | STEP3 | SORT | SORTOUT | SORTOUT | O | |

```
         ┌─1201           ┌─1202             ┌─1203
ASB=│RSVRD│, DBM=│SAMPLEDB│, ACCESS=│SHRUPD│
   PROG=│PROG02│
              └─1204
     ·
     ·
   DSN=│EXAM1│─1205
      LIST=EXAM1
     ·
     ·
   DSN= EXAM2
      LIST=EXAM2
END
```

| ACCESS DEFINITION SPEC. NAME | DATABASE NAME | PHYSICAL FILE NAME | USE PROGRAM NAME | I/O DISTINCTION |
|---|---|---|---|---|
| RSVRD | SAMPLEDB | EXAM1 | PROG02 | IO |
| RSVRD | SAMPLEDB | EXAM2 | PROG02 | IO |
| 1301 | 1302 | 1303 | 1304 | 1305 |

| JOB NAME | JOB STEP NAME | LOAD MODULE NAME | DATABASE NAME | PHYSICAL FILE NAME | DD NAME | I/O DISTINCTION | TEMPORARY FILE DISTINCTION |
|---|---|---|---|---|---|---|---|
| JOB2 | STEP1 | PROGO1 | | SAMPLE1 | DD1 | — | |
| JOB2 | STEP1 | PROGO1 | | SAMPLE2 | DD2 | O | |
| JOB2 | STEP2 | PDMBTCH | | SAMPLE2 | DD3 | — | |
| JOB2 | STEP2 | PDMBTCH | SAMPLEDB | EXAM1 | | IO | |
| JOB2 | STEP2 | PDMBTCH | SAMPLEDB | EXAM2 | | IO | |

1501  1502  1503  1504  1505  1506

| LOAD MODULE NAME | PROGRAM NAME | PROGRAM DISTINCTION | DATABASE NAME |
|---|---|---|---|
| PROG01 | PROG01 | SOURCE | SAMPLEDB |
| PROG02 | PROG02 | SOURCE | |
| SORT | SORT | UTILITY | |
| TESTPROG | | | |

1801 — PROG01 (Load Module Name)
1802 — PROG01 (Program Name)
1803 — SOURCE (Program Distinction)
1804 — SAMPLEDB (Database Name)

FIG. 21

| PHYSICAL FILE NAME | JOB NAME | JOB STEP NAME | LOAD MODULE NAME | DD NAME | I/O DISTINCTION | TEMPORARY FILE DISTINCTION | DATABASE NAME |
|---|---|---|---|---|---|---|---|
| SAMPLE1 SAMPLE1 | JOB1 JOB9 | STEP1 STEP9 | PROG01 PROG99 | DD1 DD9 | I O | | |
| 2101 | 2102 | 2103 | 2104 | 2105 | 2106 | | |

FIG. 22

| LOGIC FILE NAME | PROGRAM NAME | PROGRAM DISTINCTION | DD NAME | I/O DISTINCTION |
|---|---|---|---|---|
| INFILE OUTFILE | PROG1 PROG9 | SOURCE SOURCE | DD1 DD9 | I O |
| 2201 | 2202 | 2203 | 2204 | 2205 |

FIG. 25

```
         ┌─2501  2502        2503
//JOB1         JOB
//STEP1        EXEC PGM=PROG01
//DD1          DD DSN=SAMPLE1 , DISP=SHR
//DD2          DD DSN=SAMPLE2, DISP=SHR ─ 2504
//DD5          DD DSN=TRAN1 , DISP=SHR ─ 2506
//STEP2        EXEC PGM=TESTPROG
//DD3          DD DSN=SAMPLE2, DISP=SHR
//DD4          DD DSN=SORTFIN, DISP=OLD
//STEP3        EXEC PGM=SORT
//SYSPRINT     DD SYSOUT=A
//SORTWK01     DD UNIT=DISK, SPACE= (CYL, (5,1))
//SORTIN       DD DSN=SORTFIN, DISP=SHR
//SORTOUT      DD DSN=SORTFOUT, DISP= (NEW, KEEP, DELETE),
//                 UNIT=DISK, VOL=SER=VOL001, SPACE= (CYL, 3),
//                 DCB= (RECFM=FB, LRECL=100, BLKSIZE=1000)
//SYSIN        DD *
  SORT        FIELDS= (25, 8, ZD, A), SIZE=E5000
/*
//
```

2505

METHOD OF AUTOMATICALLY PRODUCING JOB FLOW SPECIFICATION

BACKGROUND OF THE INVENTION

The present invention relates to a computer aided software development system and, particularly, to a method of automatically producing a job flow specification suitable for software maintenance, software understanding and development of new software.

In software development, it is usual to define a function or functions which the software to be developed should have to, stepwisely refine the software for realizing the functions and, finally, to produce the desired program.

The resultant program is described as design specifications, each for one of the refinement steps, and then a specification describing respective elements of each design specification produced in the previous step in detail is produced.

Although such a method is effective in developing new software, there is a problem in performing maintenance of the software developed thereby. That is, there may be a case where an upper level specification produced in an initial step is not consistent in content with software products (a program, job control language, a lower level specification) produced by refinement of the upper level specification. In such a case, the upper level specification does not properly describe the contents of the actual program and/or job control language, making the maintenance thereof difficult.

In order to solve this problem, it is necessary to make the upper level specification consistent with the content of the actual source program and/or the job control language by producing the upper level specification from the lower level software products, such as a refined specification, a refined source program and refined job control language. Japanese Patent Application Laid-open No. 1-237726 discloses a technique to realize such a solution. In the disclosed technique, specification information to be included in an upper level specification is derived by analyzing a plurality of refined specifications or software products, such as a source program and job control language, and the derived specification information is transformed in format into the upper level specification.

SUMMARY OF THE INVENTION

The technique disclosed in the above mentioned Japanese Patent Application Laid-open No. 1-237726 is a basic method of producing an upper level software product from lower level software products. The present inventors have found, however, that the disclosed technique includes the following problems in producing a job flow specification describing an execution sequence of the source program and file input/output in a job:

(1) When a source program to be executed in a job is a utility program, it is impossible to produce an exact job flow specification since an analysis of the source program can not be carried out.

(2) When a source program is lost, it is also impossible to produce an exact job flow specification, since it is impossible to determine whether a file used is input or written or output or read, due to the impossibility of source program analysis.

(3) In a case where a database is being used, it is impossible to produce an exact job flow specification, since it is impossible to determine an input/output of the database by mere analysis of the job control language and the source program.

(4) When a load module name described in the job control language is inconsistent with the source program name, it is impossible to find a source program corresponding thereto and, therefore, it is impossible to produce an exact job flow specification.

(5) Process efficiency when an upper level specification is produced from a large amount of existing software resources is low.

(6) The only specification which can be produced is an upper level specification and, therefore, it is impossible to output information sufficient to efficiently aid in maintenance and understanding thereof and to efficiently perform a search over a change influenced range.

(7) It is difficult to produce new job control language by editing a produced job flow specification.

The present invention was made in view of the above mentioned problems and a primary object of the present invention is to provide a method by which an exact job flow specification can be produced automatically.

A second object of the present invention is to provide a method by which a job flow specification can be efficiently produced automatically.

A third object of the present invention is to provide a method by which information necessary to efficiently perform support for maintenance and understanding is obtained and a search result representing a change influenced range is output.

A fourth object of the present invention is to provide a method by which a produced job flow specification can be edited and new job control language can be produced automatically from the edited specification.

According to the present invention, in producing a job flow specification, which is upper specification information from job control language and a program, utility information containing at least a utility name, a file name it uses and file input/output distinction information is preliminarily stored, and the job flow specification is automatically produced by using the file input/output distinction information when a load module name described in the job control language is consistent with the utility name.

In accordance with the present invention, a table which defines a file input/output distinction for each of plural combinations of file production information, file deletion information and file saving information in the job control language is stored preliminarily and, when there is no source program or utility having a name identical to the load module name, an input/output distinction of a file to be used is determined from the table, upon which a job flow specification is automatically produced.

Further, according to the present invention, a database definition specification is preliminarily analyzed and, when it is determined from analysis information of job control language or a source program and the database definition specification that the database is being used, information of a database name to be used and an input/output distinction is obtained from the analysis information, with which the job flow specification is produced automatically.

Further, according to the present invention, a program name corresponding to a load module obtained by an analysis of the job control language is specified on a display screen in an interactive manner, a file to be used and an input/output distinction are obtained from an analysis of the specified source program and a job flow specification is automatically produced therefrom.

Further, according to the present invention, after information indicating that a load module name derived by a job control language analysis is a utility and information indicating existence or absence of a corresponding program analysis information, or indicating existence or absence of use of a database, are automatically produced from job control language, a source program, analysis information of the database and information related to utility, a job flow specification is automatically produced by utilizing such information.

Further, according to the present invention, on the basis of information of a plurality of job flow specifications produced as mentioned above, information indicative of a relation between a file and a job using the same and information indicative of a relation between the file and a program using the file are produced and output.

Further, according to the present invention, the job flow specification produced, as mentioned above, is edited on display screen in an interactive manner and a new job control language is automatically produced according to the edited job flow specification.

As to the first object of the present invention constructed as mentioned above, when a job flow specification, which is upper level specification information, is produced from job control language and a program, an exact job flow specification can be automatically produced even in a case where a utility is used, by storing utility information including at least a utility name, a file name to be used thereby and file input/output distinction information and by determining a file input/output distinction in the information when a load module name described in the job control language is consistent with the utility name contained in the utility information.

Further, an exact job flow specification can be produced automatically even in a case where there is no analysis information of a load module due to the fact that the load module has no source program having a name identical to a load module name described in job control language, by storing information determining the file input/output distinction for each of plural combinations of file production information, file deletion information and file saving information in the job control language and by determining the input/output distinction of the file to be used from the stored information.

Further, an exact job flow specification can be produced automatically even when a database is being used, by preliminarily analyzing a database definition specification and obtaining a database name to be used and an input/output distinction from the analysis information.

Further, since it is possible to specify a program name corresponding to a load module name on a display screen in an interactive manner, a job flow specification can be automatically produced even when it is impossible to make a source program correspond with a load module name due to a difference in the names thereof by determining an input/output distinction of a file to be used from the specified source program analysis information.

As to the second object of the present invention, a job flow specification is automatically produced efficiently with a minimum amount of information search work by preliminarily producing, from analysis information of job control language, a source program and a data base, and utilizing a table containing information indicative of whether the load module name derived from the analysis of the job control language is a utility, information indicative of whether there is program analysis information corresponding thereto and information indicative of whether there is a use of the database.

As to the third object of the present invention, when some source program or job control language is corrected, information necessary to analyze any influence produced by the correction is obtained by producing, from analysis information of job control language, a source program and a database, information related to a utility, information indicative of whether a load module name derived from the analysis of the job control language is the utility, information indicative of whether there is program analysis information corresponding thereto and information indicative of whether there is a use of the database, and by using information of a relation between a file and a job using the same and information of a relation between the file and a program using the same file. Thus, it is possible to efficiently perform maintenance and find the range which is influenced by the correction.

As to the fourth object of the present invention, since job flow specification, produced from a job control language, a source program and a database definition specification, etc., which are lower level software products, is edited on a display screen and the job control language can be automatically produced from the edited specification, the present invention contributes to an improvement of the system reconstruction efficiency.

BRIEF DESCRIPTION OF THE DRAWINGS

FIG. 2 is a block diagram of an example of a system construction for achieving an automatic job flow specification producing method of the present invention;

FIG. 3 shows an example of utility registration information to be used in the first embodiment;

FIG. 4 shows an example of JCL to be used in the first embodiment;

FIG. 5 is an example of JCL analysis information to be used in the first embodiment;

FIG. 8 is an example of program analysis information to be used in the first embodiment;

FIG. 9 is an example of basic job flow information to be produced in the first embodiment;

FIG. 21 is an example of information related to a file/job;

FIG. 22 is an example of information related to a file/program;

FIG. 25 is an example of a JCL automatically composed from the job flow specification shown in FIG. 24.

DESCRIPTION OF THE PREFERRED EMBODIMENTS

Figure 1:
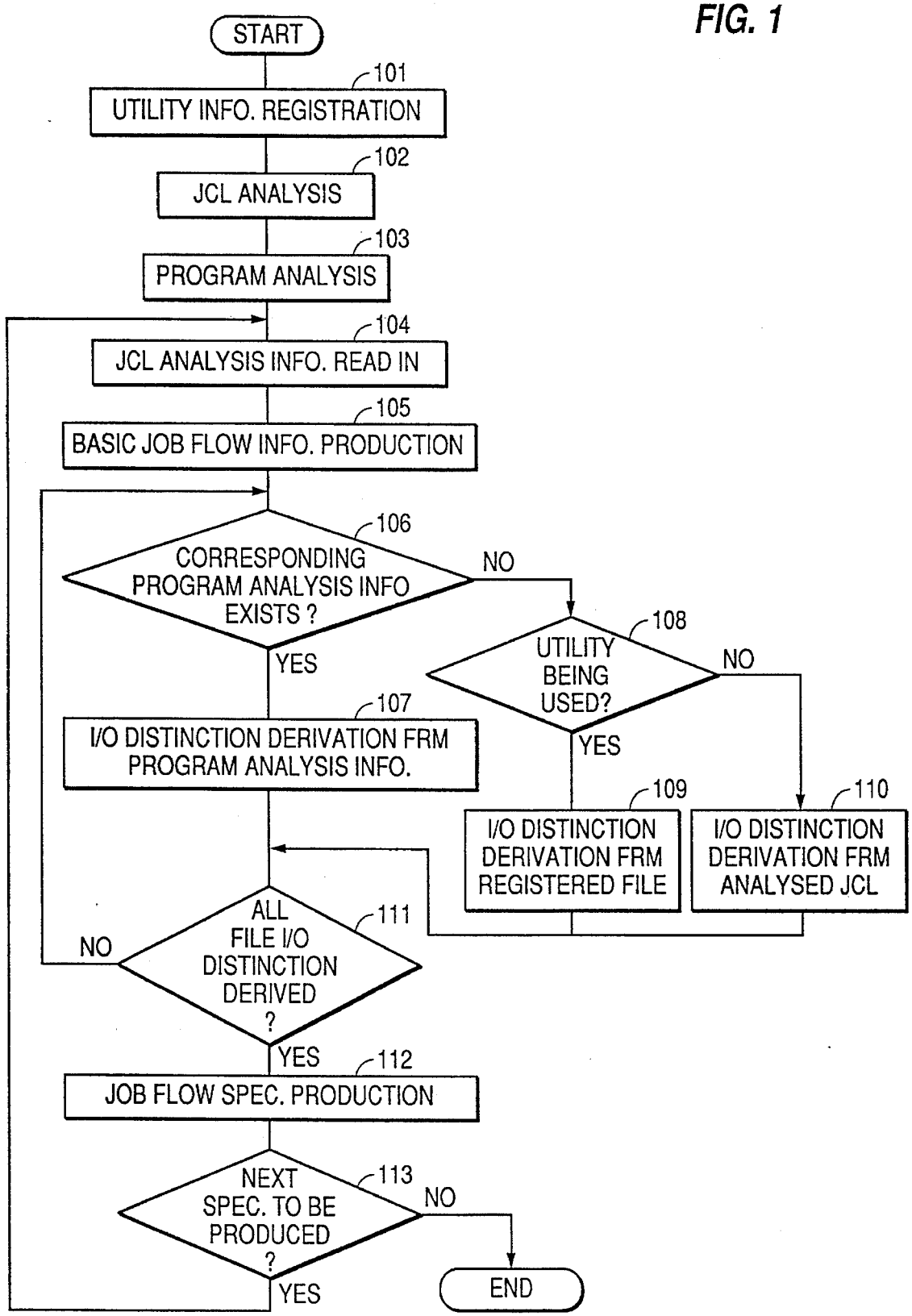
FIG. 1 is a flowchart showing a sequence of procedures according to a first embodiment of the present invention.

FIG. 2 is a block diagram schematically showing a system construction for achieving an automatic job flow specification composing method according to the present invention. In FIG. 2, a CPU 1, an interactive terminal 2, a main memory 3, an existing software resource file 4, a user-registered information file 5, a job flow information file 6 and a printer 7 are connected to each other through a bus. The CPU 1 has a sequential processing function based on a program and serves to control the execution of procedures to be described with reference to FIGS. 1, 11, 17 or 23. The interactive terminal 2 includes a keyboard, a mouse and a display screen and is used to input an instruction by an operator of the system and to display a result to the operator. The main memory 3 stores a program for realizing procedures shown in FIGS. 1, 11, 17 or 23 and intermediate results of processing. The existing software resource file 4 stores an existing software resource to be used in the system and the user-registered information file 5 stores information registered by the operator. The job flow information file 6 stores information, such as a job flow specification composed by the system, and the printer 7 is used to output the job flow specification, etc., composed by the system. Various embodiments of the present invention will be described in detail.

<Embodiment 1>

FIG. 1 is a flowchart showing procedures to be performed in a first embodiment of an automatic job flow specification composing method according to the present invention.

In FIG. 1, information related to a utility used in job control language (referred to as "JCL" hereinafter) to be analyzed is preliminarily registered (Step 101). FIG. 3 shows an example of the registered information) which is composed of a utility name 301, a DD name 302 used by the utility, a file input/output distinction flag 303 provided for each DD and a temporary file distinction flag 304 which is attached when the file is temporary.

Then, an analysis of all JCLs which are objects to be used in automatically composing the job flow specification is performed (Step 102) and then an analysis of a source program is performed (Step 103).

Figures 6, 7:
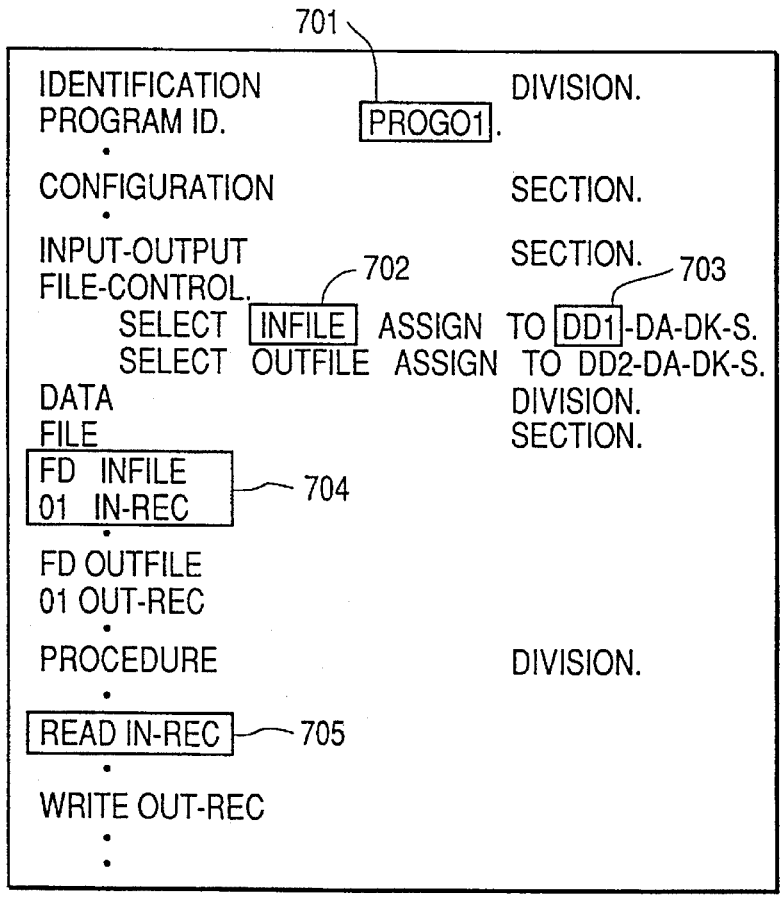
FIG. 6 is an example of a definition information for deciding a file input-output distinction for each of DISP operand combinations to be used in the first embodiment.
FIG. 7 is an example of a program to be used in the first embodiment.

FIG. 4 shows an example of JCL to be analyzed, which is composed of a job name 401, a job step name 402, a load module name 403, a physical file name 404, a data definition (DD) name 405 and a DISP operand parameter 406. A result of analysis of the JCL in FIG. 4 is stored in a table shown in FIG. 5. In FIGS. 4 and 5, the job name "JOB1" 401 in FIG. 4 is set as a job name 501 in FIG. 5, the job step name "STEP1" 402 is set as a job step name 502, the load module name "PROG01" 403 is set as a load module name 503, the physical file name "SAMPLE1" 404 is set as a physical file name 504, the DD name "DD1" 405 is set as a DD name 505 and a file input/output distinction 506 in FIG. 5 is set by information defined by a combination of DISP operand parameters, shown in the table in FIG. 6. In FIG. 6, 601 indicates a file input or a file output, which distinction is determined by a combination of DISP operand parameters, and 602 is a flag indicating that the file is temporary. The information in this table can be preliminarily registered and/or edited.

FIG. 7 is an example of a program to be analyzed. In FIG. 7, 701 refers to a program name, 702 refers to a logic file name, 703 refers to a DD name, 704 refers to a record name and 705 refers to a file input/output distinction. A result of analysis shown in FIG. 7 is stored in a table shown in FIG. 8. For example, "PROG01" 701 in FIG. 7 is set as a program name 801 in FIG. 8, "INFILE" 702 is set as a logic file name 802, "DD1" 703 is set as a DD name 803, "IN-REC" 704 is set as a record name 804 and "I" is set as a file input/output distinction 805, since "READ" 705 in FIG. 7 indicates a reading of the record and is deemed to be an input. When "WRITE" is indicated as 705 in FIG. 7, it is deemed to be an output and so "O" is set as the file input/output distinction 805 in such case.

After the above mentioned analysis, JCL analysis information (FIG. 5) necessary to automatically produce the job flow specification is read in (Step 104). Then, basic job flow information for producing a job flow specification is produced (Step 105). An example of the basic job flow information is shown in FIG. 9 which corresponds to FIG. 5. "JOB1" 501 in FIG. 5 is set as a job name 901 in FIG. 9, "STEP1" 502 is set as a job step name 902, "PROG01" 503 is set as a load module name 903, "SAMPLE1" 504 is set as a physical file name 904 and "DD1" 505 is set as a DD name 905.

Then, in order to set a file input/output distinction, it is checked whether or not there is program analysis information (FIG. 8) whose program name is consistent with the load module name 903 (Step 106). If there is a consistent program name 801, a file input/output distinction 805 indicating the program analysis information is derived from the table in FIG. 8 and added to the file input/output distinction 906 (Step 107). If there is no program analysis information whose program name is consistent with the load module name 903, it is checked whether or not a utility name consistent with the load module name 903 is registered in the table (FIG. 3) set in the Step 101 (Step 108). If there is a consistent utility name 301, an input/output distinction shown by 303 in the table is derived and added to the file input/output distinction 906 shown in FIG. 9 (Step 109). At this time, when a temporary file decision flag "Y" 304 is assigned to the temporary file indicator in the table, the temporary file distinction 907 in FIG. 9 is set with "Y". If it is decided in the Step 108 that there is no consistent utility name, a utility name is derived from the file input/output distinction 506 of the JCL analysis information (FIG. 5) and is added to the file input/output distinction 906 in FIG. 9 (Step 110).

The Steps 106 to 110 are iterated until all file input/output distinctions related to the input JCL analysis information are derived (Step 111). When all file input/output distinctions are derived, a job flow specification is produced from the basic job flow information (Step 112). Thereafter, when a next job flow specification is to be produced, the process is returned to the step 104 (Step 113) to iterate the procedure for all JCL analysis information related to the automatic job flow production, resulting in the next job flow specification.

Figure 10:
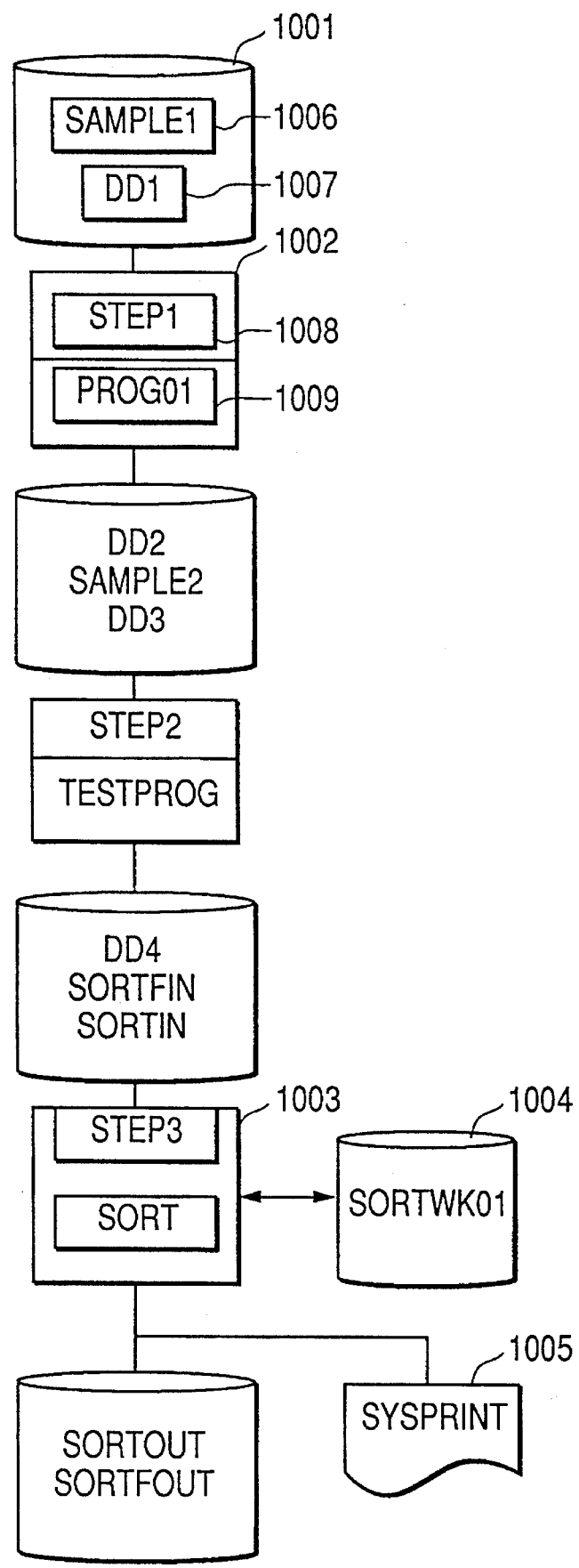
FIG. 10 is an example of a job flow specification to be produced in the first embodiment.

An example of the job flow specification produced is shown in FIG. 10. In FIG. 10, 1001 indicates a general file and 1002 indicates a general program. Further, 1003 indicates utility, 1004 indicates a temporary file and 1005 indicates a printer which is an output device. 1006 is the physical file name "SAMPLE1" 904 in FIG. 9, 1007 is the DD name "DD1" to be used in inputting the file 905, 1008 is the job step name "STEP1" 902 and 1009 indicates the load module name "PROG01" 903.

According to this embodiment, a job flow specification whose file input/output is clarified can be automatically produced arbitrarily by merely preliminarily defining a file input/output distinction which has been unclear in a utility, etc., when there is only JCL and program analysis information cannot be obtained.

<Embodiment 2>

Figure 11:
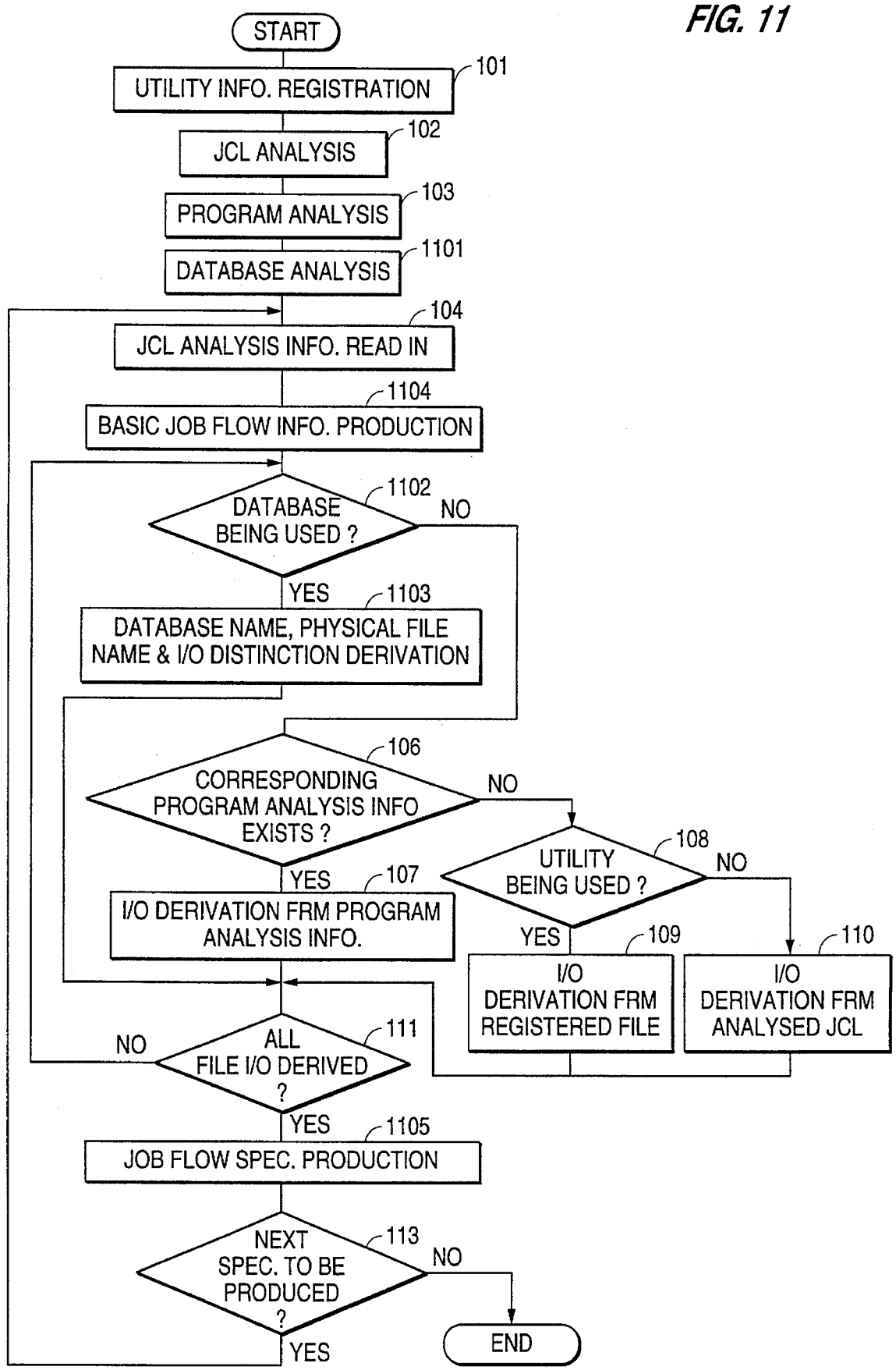
FIG. 11 is a flowchart showing a processing procedure of a second embodiment of the present invention.

FIG. 11 is a flowchart showing procedures to be performed in a second embodiment of the automatic job flow specification producing method according to the present invention. According to this embodiment, in addition to the steps of the first embodiment, a visual indication of database usage on an automatically produced job flow specification is made possible by deciding whether a file to be used is a database or a general file. In FIG. 11, the steps 105 and 112 in FIG. 1 are replaced by steps 1104 and 1105, respectively, and steps 1101, 1102 and 1103 are added. Other portions shown in FIG. 11 are the same as those in FIG. 1.

Figures 12, 13:
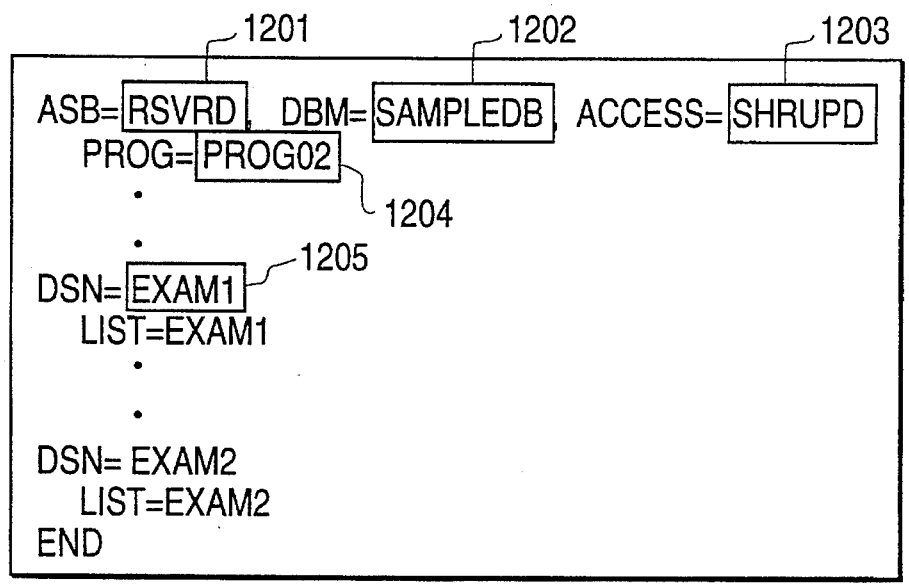
FIG. 12 shows an example of a database specification definition to be used in the second embodiment.
FIG. 13 is an example of analysis information of a database specification definition to be used in the second embodiment.

After the procedures from utility information registration to analysis of JCL to analysis of a source program are performed as in the first embodiment, an analysis of the database definition specification is performed (Step 1101). FIG. 12 shows an example of the database definition specification in which 1201 indicates an access definition specification name, 1202 indicates a database name, 1203 indicates access priority information, 1204 indicates a program name and 1205 indicates a physical file name. A result of this analysis is stored in a table, such as shown in FIG. 13. For example, "RSVRD" 1201 is set as an access definition specification name 1301, "SAMPLEDB" 1202 is set as a database name 1302, "EXAM1" 1205 is set as a physical file name 1303 and "PROG02" 1204 is set as a use program name 1304. Further, since it is indicated by "SHRUPD" 1203 that read and write is possible, input and output "IO" is set in the input/output distinction 1305.

Then, JCL analysis information for automatically producing a job flow specification is read in (Step 104) and basic job flow information is produced (Step 1104). The basic job flow information is substantially similar to that shown in FIG. 9, except that the physical file name 904 and the DD name 905 in FIG. 9 are not set. Then, in the step 1102, it is decided whether or not the database is in use, since the load module name in the JCL is a specific name used when the database is used and the source program name defined by the database definition specification is consistent with the program name obtained by the source program analysis. When the database is being used, the database name 1302, the physical file name 1303 and the input/output distinction 1304 are set in the basic job flow information in the step 1103. When the source program name defined by the database definition specification and the program name obtained by the source program analysis are not consistent, the file input/output distinction is derived by a procedure similar to that of the first embodiment.

Figure 14:
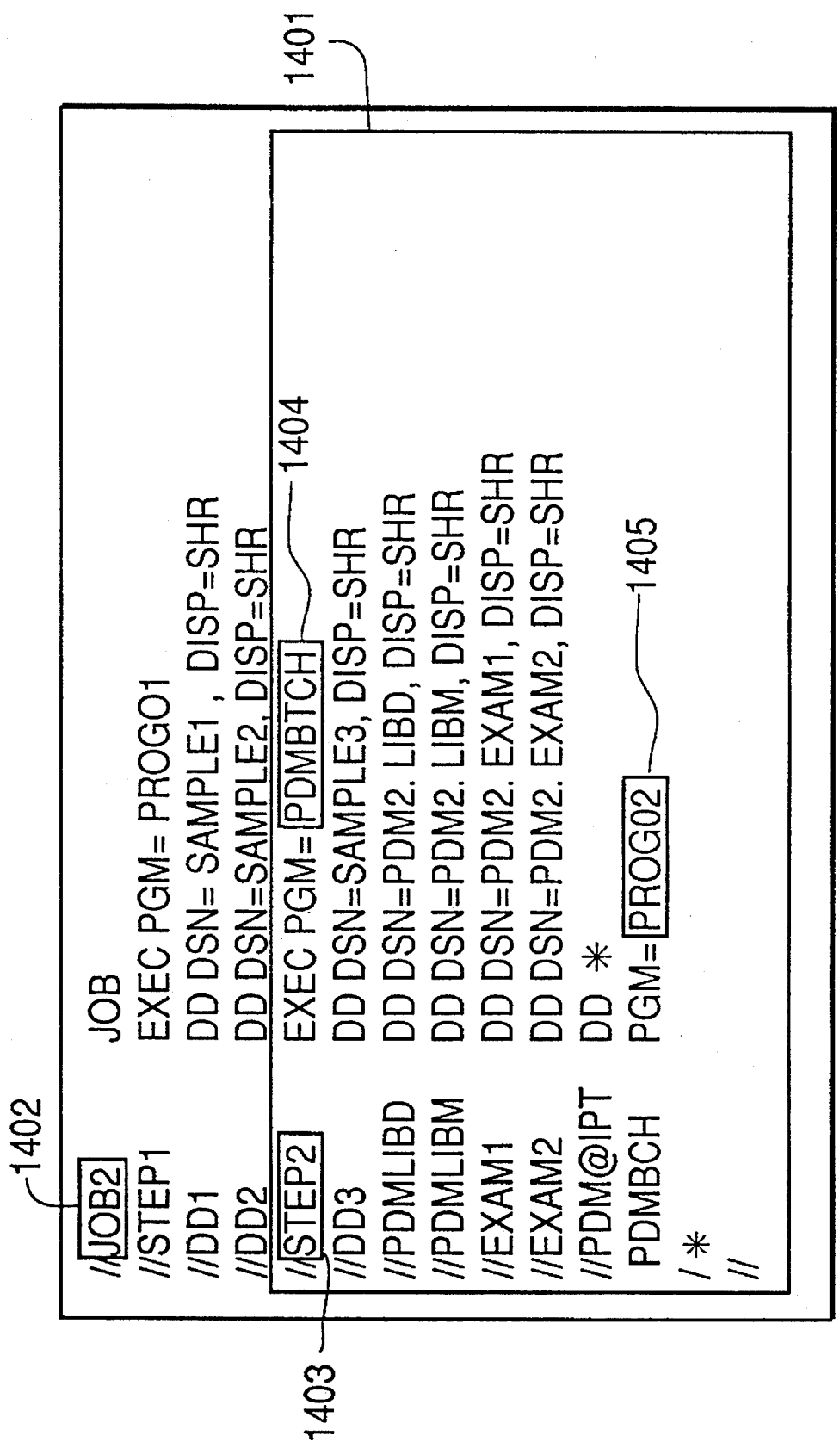
FIG. 14 shows an example of JCL to be used in the second embodiment.
Figure 15:
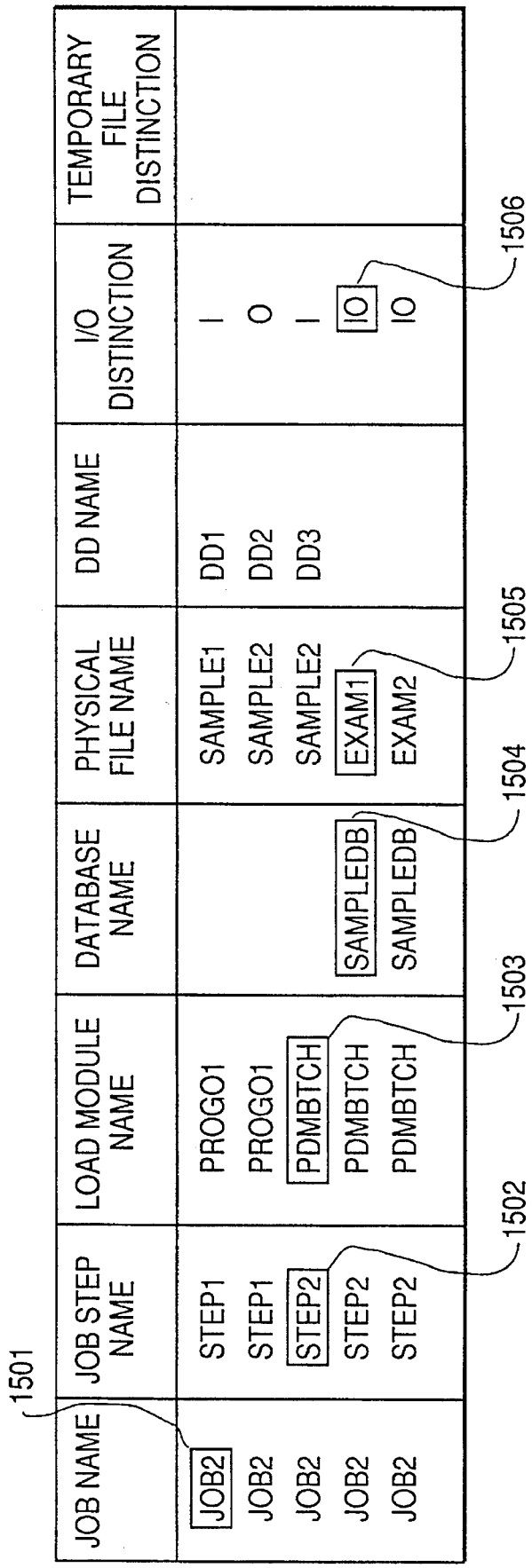
FIG. 15 is an example of basic job flow information to be produced in the second embodiment.

FIG. 14 shows a case where the specific name used in the JCL, which is used, when the database is used, is described in the load module, and FIG. 15 shows the basic job flow information produced by taking the database analysis information in. A portion in FIG. 14 surrounded by a line 1401 is a JCL portion which uses the database. For the JCL portion using the database, "JOB2" 1402 in FIG. 14 is set as a job name 1501 in the basic job flow information shown in FIG. 15, "STEP2" 1403 is set as a job step name 1502, "PDMBTCH" 1404 is set as a load module name 1503, "SAMPLEDB" 1302 of the database analysis information shown in FIG. 13 is set as a database name 1504, "EXAM1" 1303 is set as a physical file name 1505 and "IO" 1305 is set as an input/output distinction 1506.

Figure 16:
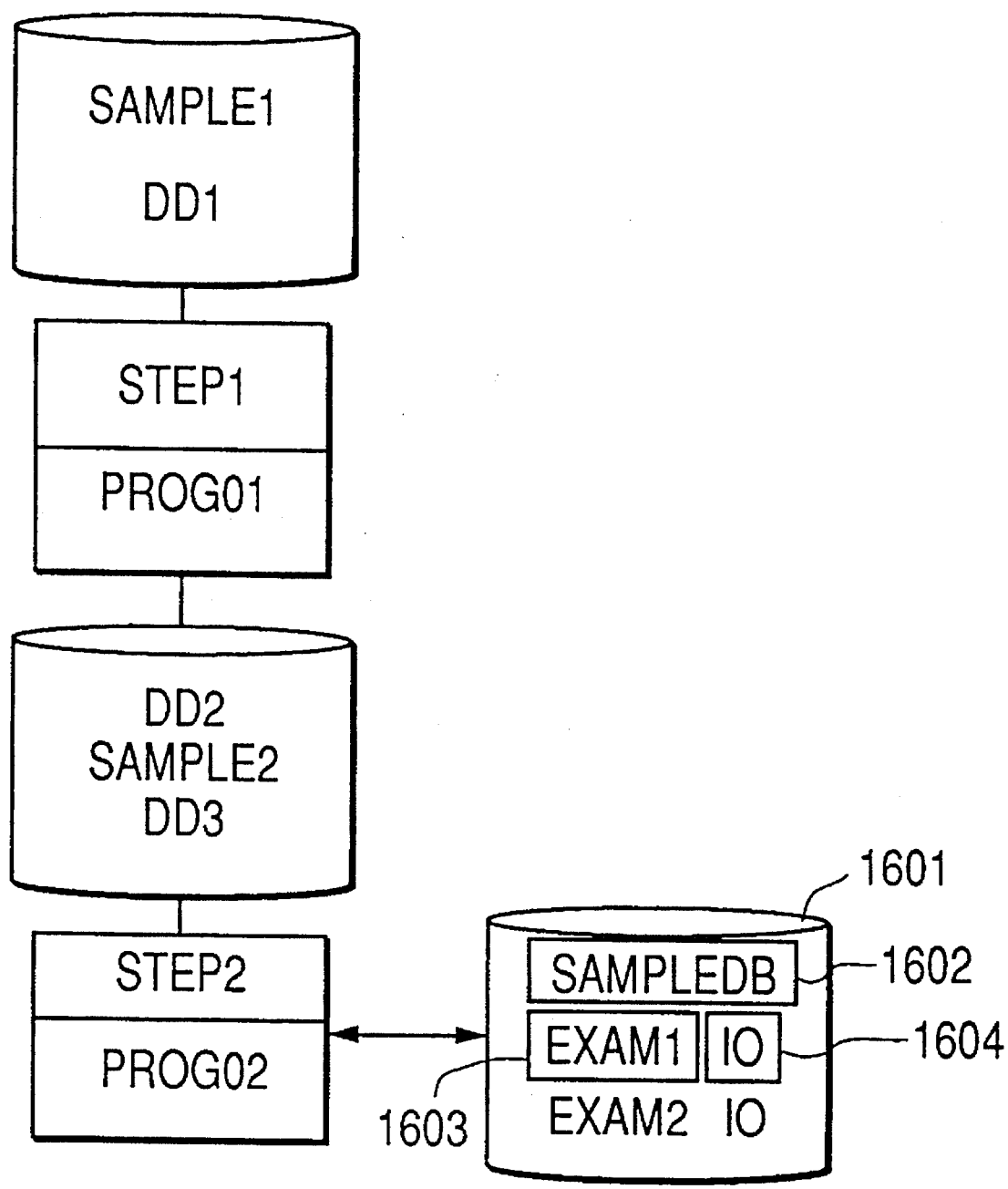
FIG. 16 is an example of a job flow specification to be produced in the second embodiment.

The job flow specification is automatically produced from the basic job flow information (Step 1105). In the step 1105, a case where the database is used in producing the job flow specification (Step 112) in FIG. 1 is visually indicated, additionally. FIG. 16 shows an example of the job flow specification. 1601 indicates the database distinguished from the general file, 1602 indicates the database name 1504 in FIG. 15, 1603 indicates the physical file name 1505 which is used in the database and 1604 indicates the input/output distinction 1506.

According to this embodiment, it is possible to automatically produce the job flow specification, including the information of the database usage, in addition to the job flow specification of the first embodiment shown in FIG. 10.

<Embodiment 3>

Figure 17:
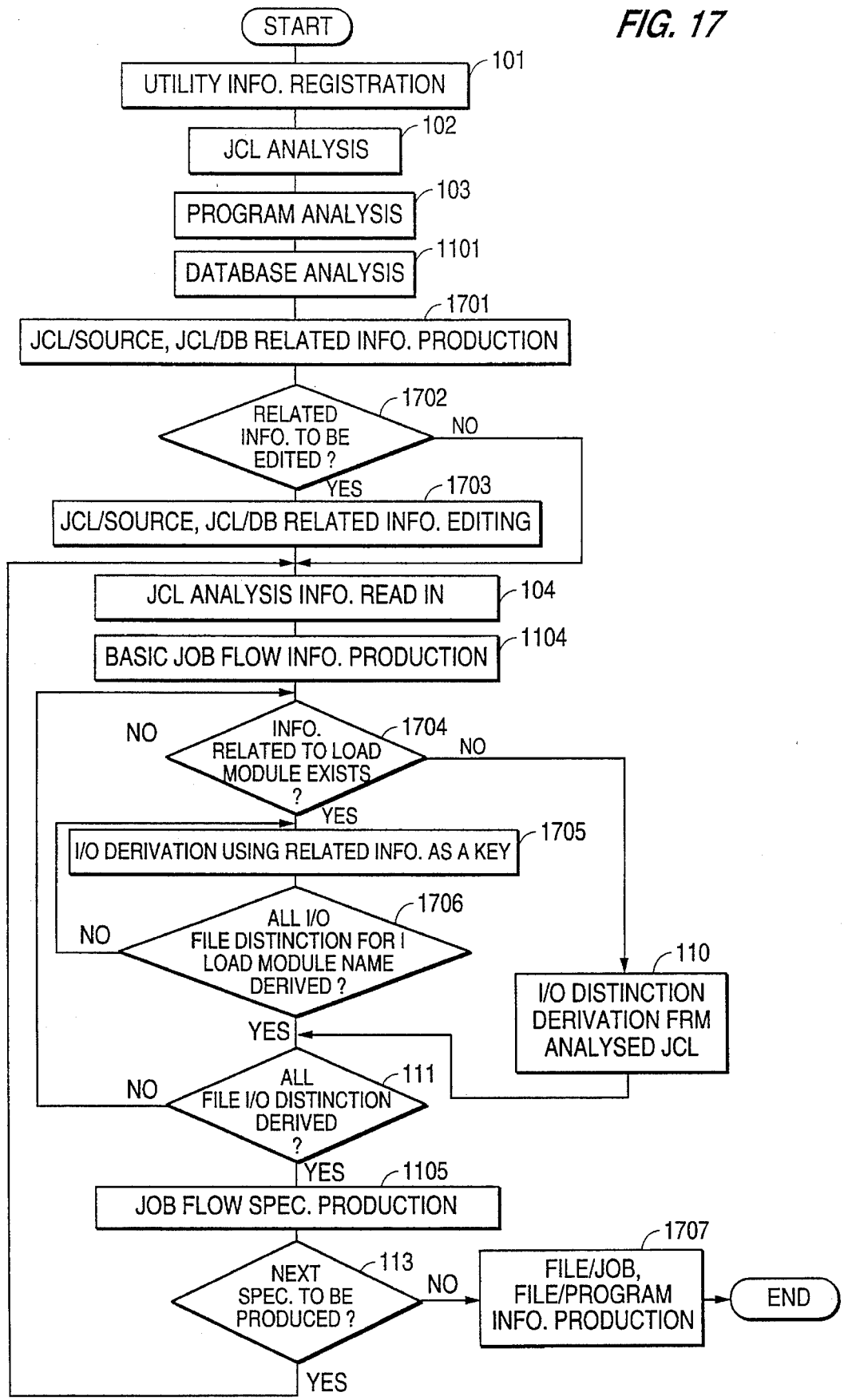
FIG. 17 is a flowchart showing a procedure of a third embodiment of the present invention.

FIG. 17 is a flowchart showing procedures to be performed in a third embodiment of an automatic job flow specification producing method according to the present invention. In the second embodiment shown in FIG. 11, in order to derive the file input/output distinction, a search is performed for each information to determine the existence or absence of program analysis information, the existence or absence of registered utility information and the usage of the database, as mentioned previously. Therefore, a long time may be necessary to perform such a search when a large amount of software resources exist. In the third embodiment, in order to improve the process efficiency and to make it possible to automatically produce a more accurate job flow specification compared with the second embodiment, an information table indicating a relation between respective analysis information is automatically produced after these analyses are completed. The third embodiment improves the second embodiment in that it can automatically produce a job flow by deriving a file input/output distinction by searching only files storing information having a relation indicated by the information table when the job flow specification is being produced. Thus, as shown in FIG. 17, steps 1701, 1702, 1703, 1704, 1706 and 1707 are added to FIG. 11, the steps 1102, 106 and 108 in FIGS. 1 and 11 are deleted and the steps 107, 109 and 1103 in FIGS. 1 and 11 are combined to a single step 1705.

Figures 18, 19:
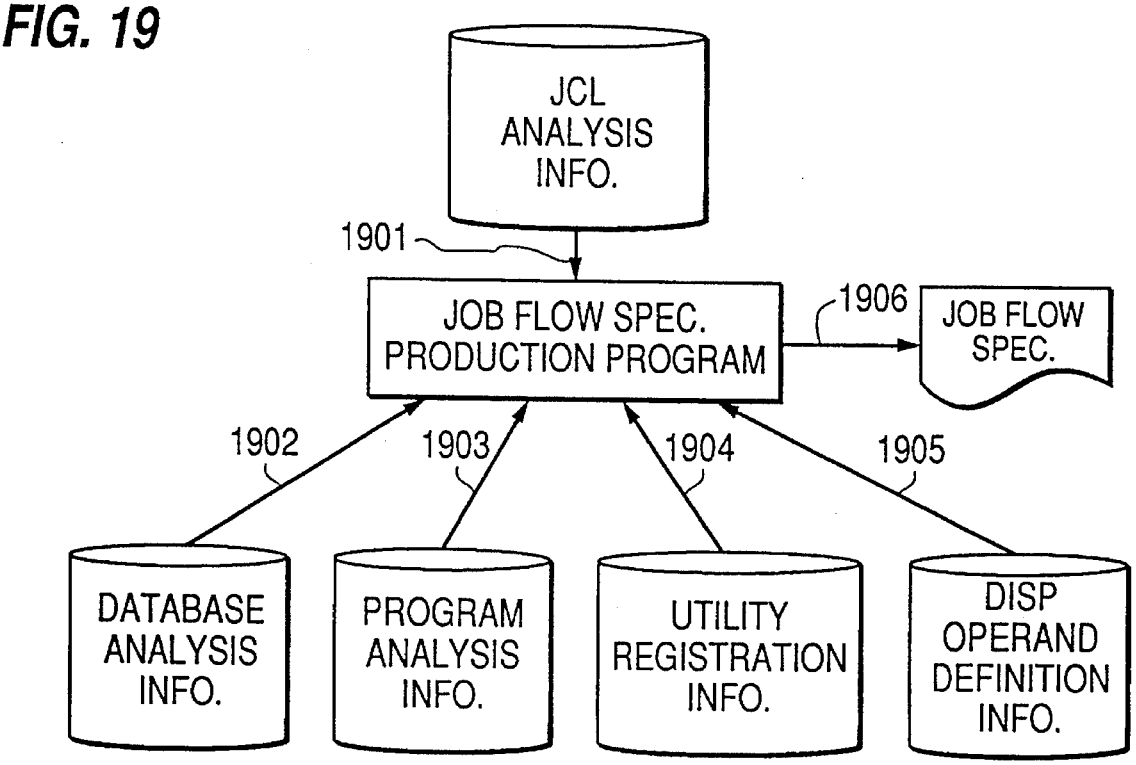
FIG. 18 is an example of a related information table to be produced in the third embodiment.
FIG. 19 shows an example of a file and an input/output distinction deriving procedure thereof as used in the second embodiment.

The procedure up to the database analysis is performed as in the second embodiment (Steps 101, 102, 103 and 1101) and then an information table indicating a relation between respective information is automatically produced (Step 1701). FIG. 18 shows an example of the information table. In FIG. 18, the load module name 503 in FIG. 5 obtained from the JCL analysis is set as 1801 and the program name 801 as in FIG. 8 corresponding thereto or the utility name 301 in FIG. 3 is set as 1802. The correspondence between the load module and the program is determined by using a member name storing the program or a program ID described in the program. After the information table is produced, it is determined whether there is a necessity of editing related information (Step 1702). If editing is necessary, the program name 1802, the program distinction 1803 and the database name 1804 in use are edited in an interactive manner on the display screen (Step 1703).

Thereafter, JCL analysis information for automatically producing a job flow specification is read in (Step 104) and basic job flow information is produced (Step 1104) and, then, it is determined from the information table in FIG. 18 whether or not there is information related to the derived load module name (Step 1704). If there is corresponding information, a file name and its file input/output distinction are derived from information existing within the table, by searching only the file storing information corresponding to the load module (Step 1705). If there is no related information, a file name and its file input/output distinction are derived from the table defined by the combination of DISP operands (Step 110). This procedure is performed for all files within one load module to derive file names and their file input/output distinctions (Step 1706).

Figure 20:
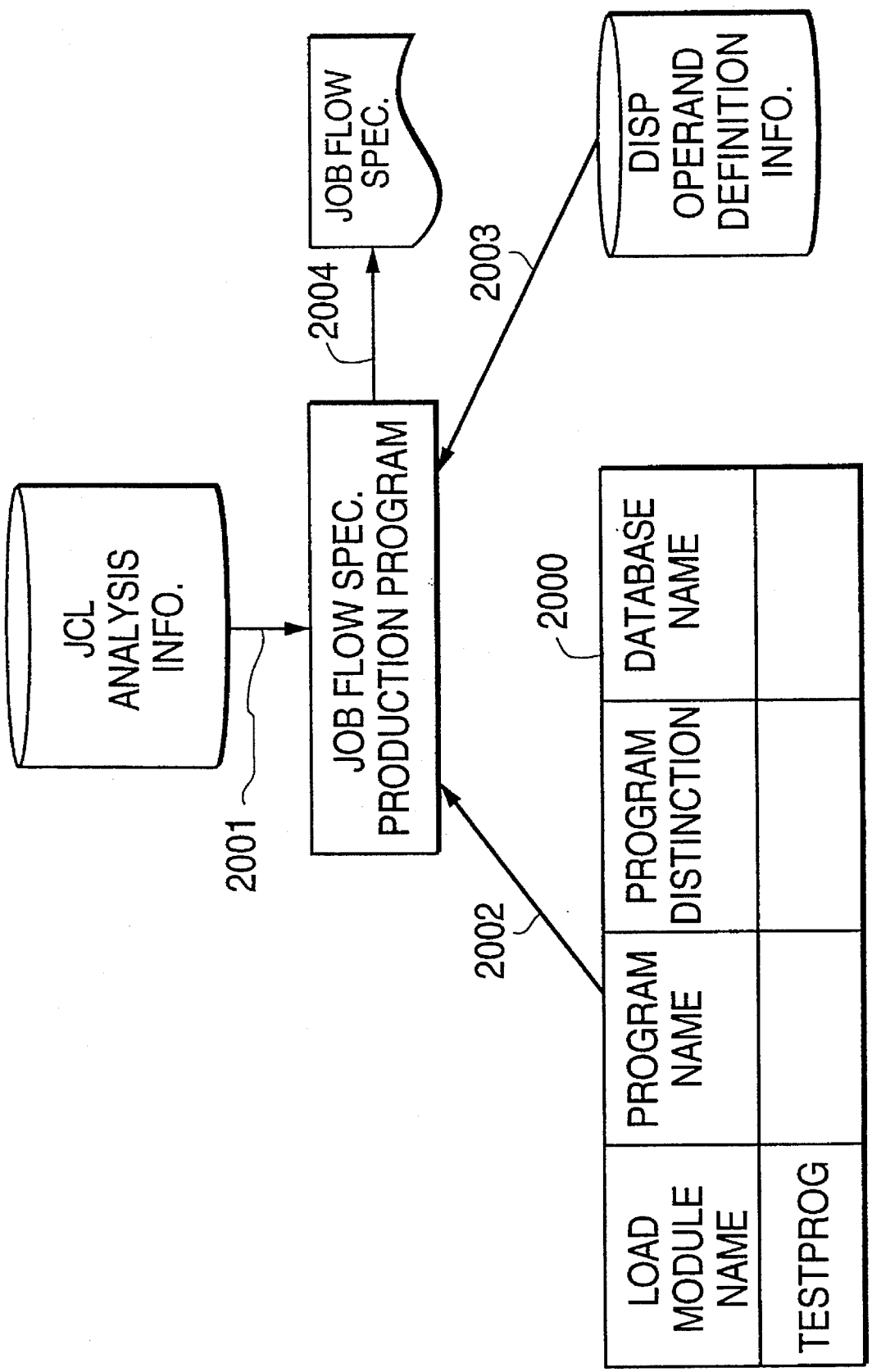
FIG. 20 shows an example of a file and an input/output distinction deriving procedure thereof as used in the third embodiment.

Now, the difference in procedure between a case where the information table showing relations (JCL/source, JCL/DB) of the respective information and a case where such an information table is not used will be described. FIG. 19 shows an example in which the job flow specification is automatically produced according to the procedure of the second embodiment, and FIG. 20 shows a procedure by which the job flow specification is automatically produced by using the table produced by this third embodiment. In this embodiment, the example is for a case where there is completely no analysis information corresponding to the load module name " TESTPROG".

In FIG. 19, a load module name 1901 is derived from JCL analysis information, which is an object for automatic production of a job flow specification, and then a search for database analysis information 1902 to determine whether or not the database is being used is performed. If there is no database analysis information, then a search for program analysis information 1903 having a program name consistent with the load module name is performed. If there is no program analysis information, then a search for registered utility information 1904 is performed. When there is no information corresponding to the load module, as in this example, a file input/output distinction 1905 defined by the DISP operand under the JCL analysis is derived, and then the job flow specification 1906 is automatically produced.

In FIG. 20, a load module name 2001 is derived from JCL analysis information which is an object for automatic production of a job flow specification, and it is determined whether there is related information 2002 from a table 2000 produced in this embodiment. In this example, there is no information corresponding to the load module. Therefore, a file input/output distinction 2003 defined by the DISP operand is derived directly and the job flow specification 2004 is automatically produced. With such a difference in procedure, the processing efficiency can be improved.

In the step 1707 in FIG. 17, information of a relation between the physical file and job as shown in FIG. 21 and information of a relation between the logic file and program shown in FIG. 22 are produced from the table information previously produced and output. In FIG. 21, " SAMPLE1" 504 in FIG. 5 which is obtained by the JCL analysis is set as a physical file name 2101, "JOB1" 501 is set as a job name 2102, "STEP1" 502 is set as a job step name 2103, "DD1" 505 is set as a DD name 2105 and "I" 506 is set as a file input/output distinction 2106, which are output to the printer. From such output information, it can be clarified which file is accessed in which job step of which job. Further, as shown in FIG. 22, "INFILE" 802 in FIG. 8 which is obtained by the program analysis is set as a logical file name 2201, "PROG01" 801 is set as a program name 2202, "DD1" 803 is set as a DD name 2204, "I" 805 is set as a file input/output distinction 2205 and "SOURCE" 1803 is set in FIG. 18 is set as a program distinction 2203, which information is output to the printer. From the information, it is clarified which file of which program is accessed, and it becomes possible to preliminarily find an area to be influenced when a correction related to a file under use is performed, etc.

According to this embodiment, the processing efficiency becomes higher than that in the second embodiment. Further, as to information for which a load module name in the JCL is inconsistent with a source program name, since it is possible to specify a program name corresponding to the load module name on the display screen in an interactive manner, it is possible to automatically produce a more exact job flow specification by automatically taking in a file input/output distinction of the specified program.

<Embodiment 4>

Figure 23:
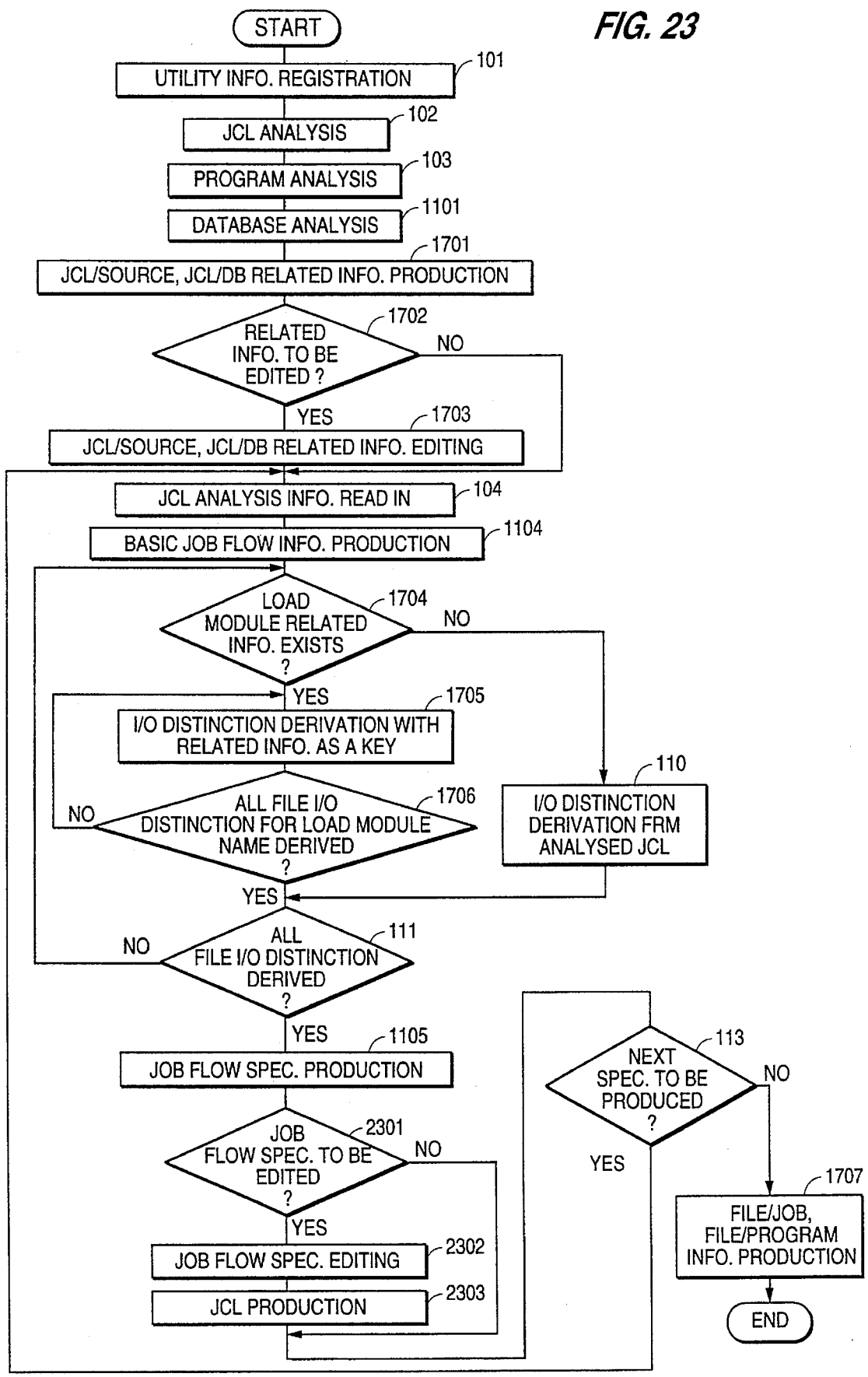
FIG. 23 is a flowchart showing a processing procedure of a fourth embodiment of the present invention.

FIG. 23 is a flowchart showing procedures of a fourth embodiment of automatically producing a job flow specification according to the present invention. This embodiment is the embodiment shown in FIG. 17 including additional steps 2301, 2302 and 2303. In this embodiment, a job flow specification automatically produced by one of the first, second and third embodiments is edited and a new JCL is automatically produced from the edited job flow specification.

Figure 24:
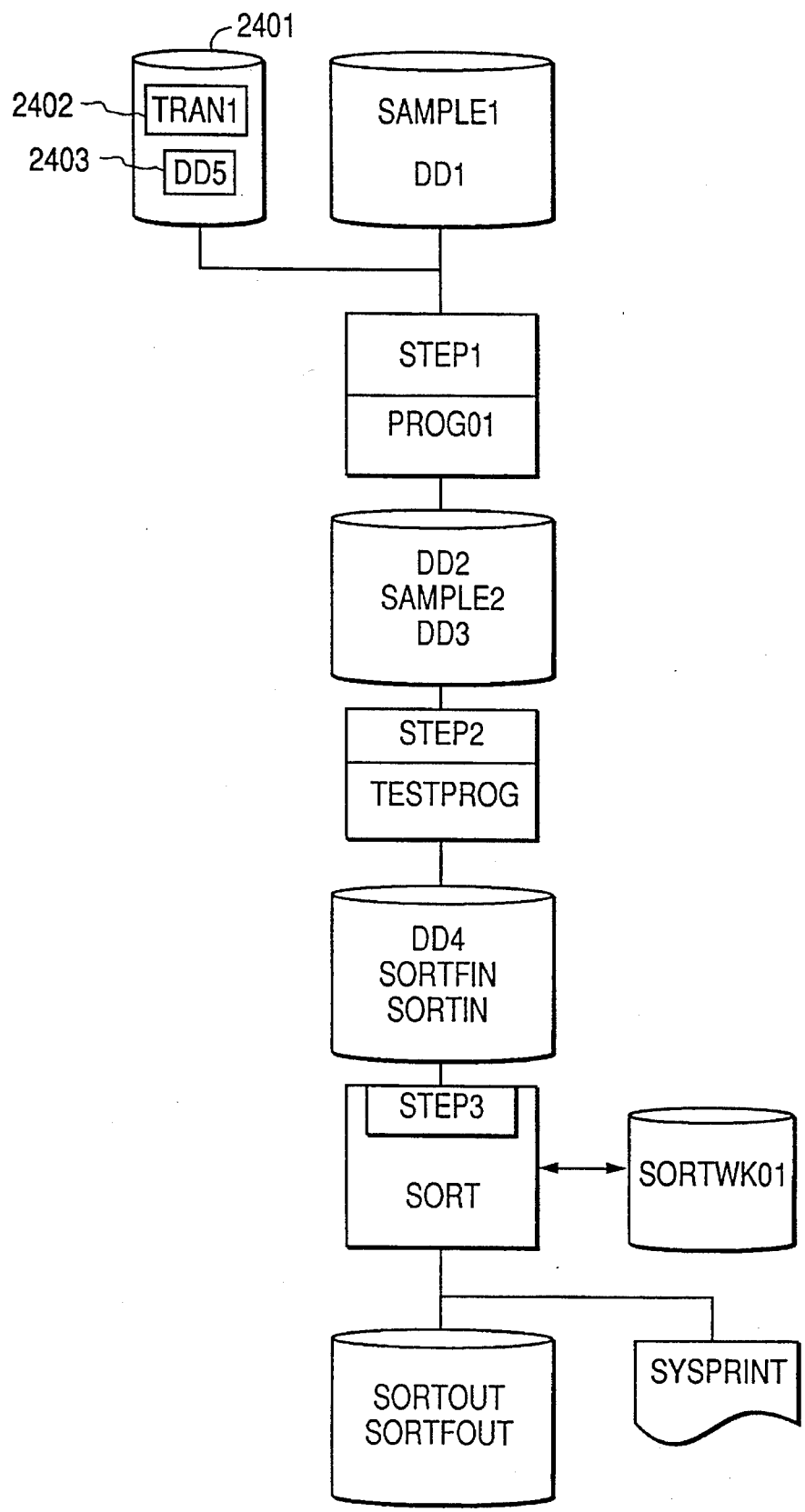
FIG. 24 is an example of a job flow specification obtained by editing the job flow specification shown in FIG. 10.

In FIG. 23, it is determined whether an automatically produced job flow specification is to be edited (Step 2301). If yes, it is edited on the display screen by using a mouse or keyboard (Step 2302). FIG. 24 shows an example of an edited job flow specification which is obtained by editing the automatically produced job flow specification shown in FIG. 10. The editing includes information related to an input of a file having a physical file name "TRAN1" 2402 and a DD name "DD5" 2403 to the load module name "PROG01" 903 and the job step "STEP1" 902 for the JCL having the job name "JOB1" 901 shown in FIG. 9.

Then, JCL is automatically produced from the edited job flow specification (Step 2303). FIG. 25 shows an example of the automatically produced JCL. Since "JOB1" 2501, "STEP1" 2502 and "PROG01" 2503 are JCL analysis information (FIG. 5) of the automatically produced job flow specification already obtained, and since the file input/output distinction is "input", the JCL edited and automatically produced by this embodiment includes "DD5" 2403 in FIG. 24 set as a DD name 2505, "TRAN1" 2402 set as a physical file name 2504 and "DISP=SHR" set as a DISP operand parameter 2506.

According to this embodiment, a job flow specification automatically produced from JCL and a program, etc., is edited and new JCL is automatically produced from the edited job flow specification.

We claim:

1. A method of producing a job flow specification by determining a sequence of execution of respective load modules and a file input/output distinction of each of at least one file to be used in job control language by analyzing the job control language and a source program and producing a job flow specification in graphic representation including a sequence of execution of programs in a job and the file input/output distinction of each of the at least one file with the aid of a computer, the file input/output distinction indicating whether each of the at least one file is to be input or output, the method being executed by a computer and comprising the steps of:

preliminarily storing utility program information, the utility program information including a utility program name to be used in said job control language, a file name thereof, and a file input/output distinction;

analyzing said job control language with the computer;

determining, from the stored utility program information, whether a load module name obtained in the step of analyzing said job control language is a utility program name;

determining a file input/output distinction of each of at least one file to be used by a utility program having the utility program name from the stored utility program information; and producing a job flow specification for a load module having the load module name determined to be the utility program name based on at least the file input/output distinction of each of the at least one file to be used by the utility program having the utility program name.

2. The method claimed in claim 1, further comprising the steps of:

storing information determining a file input/output distinction for each of plural combinations of information indicative of a file production operation, a file deletion operation, and a file saving operation in the job control language;

determining a file input/output distinction of each of at least one file to be used by a load module from the stored input/output distinction information when there is no source program having a source program name identical to a load module name of the load module; and producing said job flow specification based on at least the file input/output distinction of each of the at least one file to be used by the load module having the load module name to which no source program name is identical.

3. The method claimed in claim 2, further comprising the steps of:

obtaining a database name for which a load module is input or output by analysis of a database definition specification of a database; and outputting information related to said database to the job flow specification.

4. The method claimed in claim 3, further comprising the steps of:

specifying a source program name corresponding to said load module interactively; and obtaining the input/output distinction of the file to be used from analysis information of said source program.

5. The method claimed in claim 4, further comprising the steps of:

preliminarily producing at least one of (1) information indicative of whether a load module name derived from analysis of job control language is a utility program, (2) information indicative of whether there is program analysis information corresponding thereto, and (3) information indicative of whether said database is in use; and producing the job flow specification by utilizing the preliminarily produced information.

6. The method claimed in claim 5, further comprising the step of:

producing relation information of a relation between a file and a job or a file and a program on the basis of information related to a plurality of produced job flow specifications and outputting the produced relation information.

7. The method claimed in claim 6, further comprising the steps of:

editing a produced job flow specification on demand of a computer operator; and automatically producing a new job control language from the edited specification.

* * * * *